Feb. 22, 1938.     A. SPANDE     2,109,055
CULTIVATOR SHOVEL POSITIONING MECHANISM
Filed Nov. 27, 1936
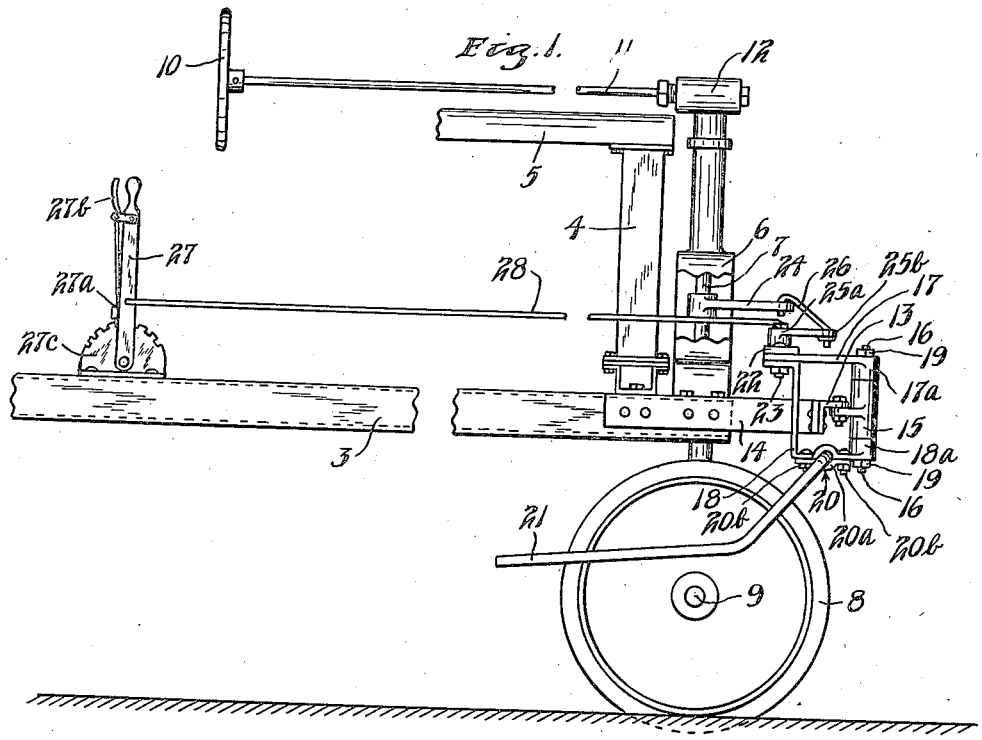
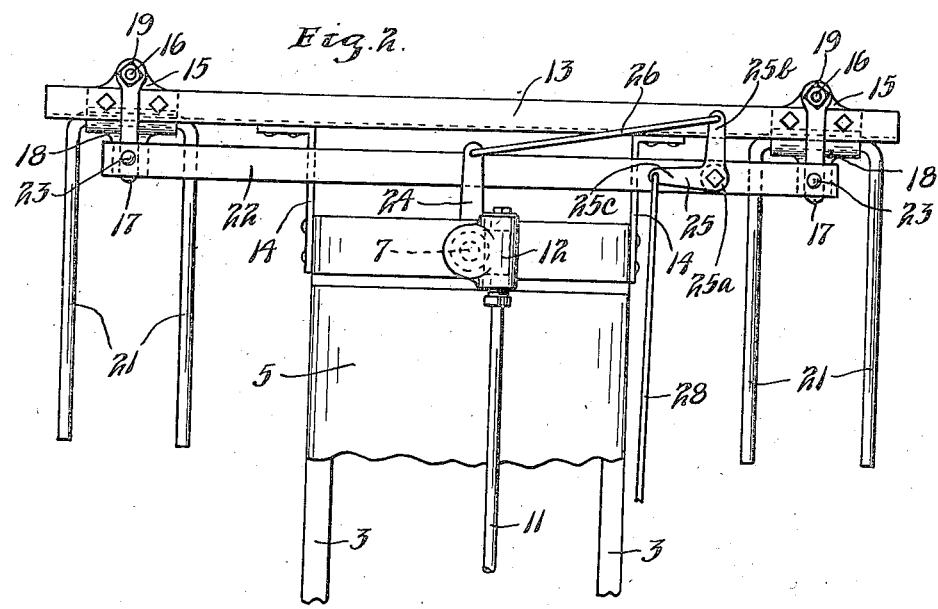
INVENTOR.
ALTON SPANDE
BY HIS ATTORNEYS
Williamson & Williamson.

Patented Feb. 22, 1938

2,109,055

UNITED STATES PATENT OFFICE 2,109,055

CULTIVATOR SHOVEL POSITIONING MECHANISM

Alton Spande, Mabel, Minn.

Application November 27, 1936, Serial No. 112,867

5 Claims. (Cl. 97—47)

My invention relates to agricultural implements and particularly to improvements in mechanism for shifting the positions of soil working tools such as cultivator shovels and the like carried thereby.

To facilitate rapid lateral displacement of soil-working tools such as cultivator shovels and like, as for dodging obstructions and following crooked rows of plants, means have been devised and incorporated in implements for shifting such soil-working tools mounted on the front portion of an implement transversely of such implement responsive to operation of the steering means of the implement so that the soil-working tools will be shifted to one side or the other responsive to the combined effects of such shifting means and the steering of the implement. When such an implement is travelling along the side of a slope, the same will usually be disposed with its longitudinal axis at an angle to and pointing somewhat uphill from the actual direction of travel of the implement with the result that soil-working tools carried by the rear portion of the implement are shifted to one side of the preferred positions thereof relative to the positions of soil-working tools carried by the front portion of the implement. From the above it follows that conveniently operatable means is desirable for obtaining a proper relation between front and rear tools by adjustively shifting the front soil-working tools to one side or the other of the positions they would otherwise occupy without interfering with operation of the means for automatically shifting the tools responsive to steering of the implement.

A general object of my invention is to provide, in an agricultural implement having automatic mechanism for shifting soil-working tools on the front portion thereof transversely thereof responsive to steering of the implement, means for shifting said soil-working tools to one side or the other of positions wherein said tools would otherwise be placed by said mechanism.

Another object is to provide such auxiliary shifting means which may be conveniently and selectively set by an operator of the implement and locked in any selected position.

Still another object is to provide such auxiliary shifting means which will not interfere, in any of its positions, with functioning of the automatic tool shifting means.

Yet another object is to provide such means capable of altering the positions of a plurality of soil-working tools similarly and in unison.

A further object is to provide such auxiliary means of simple, inexpensive, compact and relatively light construction.

These and other objects and advantages of the invention will be more fully set forth in the following description made in connection with the accompanying drawing, in which like reference characters refer to similar parts throughout the several views, and in which:—

Fig. 1 is a side view of a portion of an agricultural implement having an embodiment of my invention incorporated therein; and Fig. 2 is a top view.

Referring to the drawing, an embodiment of my invention is shown as incorporated in the structure of a well known combined tractor and agricultural implement wherein the frame of the machine is used to support numerous soil-working tools and the like which are quickly and easily attachable to and detachable from the same. This combined tractor and universal implement includes a frame 3, an engine cooling radiator 4, an engine sheltering roof 5, a vertical steering column bearing 6 mounted on the forward end of the frame 3, a vertical steering column or pivot shaft 7 journalled in the bearing 6, a front wheel 8 rotatably mounted on a spindle 9 attached to the lower end of the shaft 7, and a steering wheel 10 situated for accessibility to an operator of the machine and connected through a steering shaft 11 and steering mechanism 12 to the upper end of the steering column 7 so as to be rotatable for steering of the wheel 8. For attachment of soil-working tools or the like to the machine, a horizontal tool supporting beam 13, disposed laterally relative to the frame 3, is supported from and forwardly of the forward end of the frame 3 by brackets 14 each secured at its respective ends to the frame 3 and the beam 13. Adjacent each of the respective ends of the beam 13, a vertically disposed bearing 15 is mounted on the forward side of the beam 13 and a swivel element or pivot shaft 16 is journalled therein. A hubbed lever 17 is mounted, at its hub portion 17a, on a portion of the shaft 16 projecting above the bearing 15 and is normally positioned to extend generally rearwardly therefrom. A second hubbed lever 18 is mounted, at its hub portion 18a on a portion of the shaft 16 projecting below the bearing 15 and is normally positioned to extend generally rearwardly therefrom in parallel relation with the first hubbed lever 17. The hubs 17a and 18a are restrained by suitable conventional means (not shown) from rotation on the shaft 16 and are secured against movement longitudinally therefrom by nuts 19 screw-threadedly mounted on the respective ends of each of the shafts 16. The lever 18 is provided with a horizontally disposed bearing 20 extending transversely thereof and clampable to solidly grip an object journalled therein. The bearing 20 is formed by an arcuately curved portion of the lever and a bearing cap 20a attached to the lever 18 by means of clamping bolts 20b. Outwardly of the bearing 20, the lever 18 is extended and bent upwardly and then rearwardly so that its rearmost portion lies against the lower side of the rearmost portion of the upper lever 17. The rear portions of the levers 17 and 18 have registering apertures therethrough for a purpose to be described.

At each side of the machine a generally U-shaped member 21 is journalled at its medial portion in the corresponding one of the bearings 20 and is disposed with the respective legs of the U extending generally rearwardly and downwardly to comprise tool carrying arms the free end portions of which soil-working tools such as cultivator shovels may be attached. From the above description it should be apparent that swinging of the lever 17 will cause shifting of tools so mounted from side to side, that is, laterally of the machine.

The above described structure is of conventional design and an embodiment of my invention is shown operatively associated therewith and will be described.

Means is provided for so connecting the respective levers 17 so that the same may be shifted only in a similar manner and in unison. To this end a member 22 extending laterally of the machine is pivotally connected at its respective ends to the apertured free ends of the respective levers 17 by suitable means such as the nutted bolts 23. It should be apparent that movement of the member 22 longitudinally, that is, laterally of the machine will shift the free ends of the U-shaped tool carrying member 21 in the same direction but through a greater distance.

A forwardly extending lever 24 is mounted on the medial portion of the steering column 7 in non-revoluble relation thereto so as to rotate therewith in response to each and every steering operation performed. Steering toward a given side will displace the free end of the lever 24 toward the same side of the machine. The free end of the lever 24 is provided with a vertical aperture therethrough for receiving one end of a link element to be described.

The lever or arm 24 on the steering column 7 is connected to the member 22 by adjustable means whereby the position of the member 22 and hence the positions of the tool carrying members or arms 21 may be adjustively shifted toward one side or the other relative to the position of the lever 24. The connection means referred to preferably consists of a link 26 connected at one of its ends to the arm 24 and at the other of its ends to an element adjustively shiftable in position in a direction generally longitudinally of the member 22. While various types of elements may be used to provide such a connection I have shown means including a bell-crank 25 pivotally mounted at its hub portion on the member 22 toward one end thereof by means of a pivot bolt 25a and lying substantially in a horizontal plane with the arms 25b and 25c thereof normally projecting respectively substantially forwardly and substantially inwardly toward the longitudinal axis of the machine. The link 26 is pivotally connected at its respective ends to the respective forward ends of the arm 24 on the steering column 7 and the forwardly projecting arm 25b of the bell-crank 25. The link 26 may consist of a rod having its ends bent at right angles and extended downwardly through suitable apertures in the forward portions of the respective arms 24 and 25b, as shown.

Means is provided for adjustively rotating the bell-crank 25 between angular limits somewhat less than 180 degrees apart so as to adjustively alter the relationship between the respective positions of the arm 24 and the tool carrying arms 21. For this purpose a manually operatable control lever 27, swingably mounted at its lower end on the frame 3 for forward and rearward movement, is placed in a position readily accessible to an operator of the machine and preferably at a relatively great distance rearward of the bell-crank 25. The medial portion of the lever 27 is connected to the inwardly projecting arm 25c of the bell-crank 25 by a link 28 which may consist of a rod of which the respective ends are bent at right angles and extended through suitable apertures in the lever 27 and the bell-crank arm 25c. Obviously, forward and rearward movements of the control lever 27 will cause respective clockwise and counter-clockwise rotations of the bell-crank 25 with accompanying changes in the relation between the respective positions of the arm 24 on the steering column 7 and the tool carrying arms 21.

In order to enable locking of the bell-crank 25 in any desired adjusted position thereof, the control lever 27 is provided with a dog 27a operatable by a swingable hand piece 27b on the upper end of the lever 27 and engageable with a toothed quadrant 27c mounted on the frame 3 in a commonly known manner.

It is to be noted that the apertured forward or free end of the arm 25b of the bell-crank 25, considered broadly, constitutes an element carried by the member 22 and adjustively movable relative thereto in a direction substantially longitudinally thereof and substantially parallel to the length of the link 26. The direction referred to also extends substantially laterally of the machine.

With the control lever 27 and hence the bell-crank 25 secured in a fixed position the forward end of the bell-crank arm 25 constitutes an element carried by the member 22 in fixed relation thereto. Under such conditions, steering of the machine toward one side or the other will, through the arm 24, link 26, bell-crank 25, member 22 and the respective levers 17, pivots 16, levers 18 and tool-carrying arms 21, shift all of the tools carried by the arms 21 in unison laterally of the machine toward the side the machine is being steered toward. Moving of the member 22 and the bell-crank 25 carried thereon toward one side or the other will not cause appreciable if any rotational movement of the bell-crank 25 since the link 28 between the bell-crank 25 and the control lever 27 extends at substantially right angles to the direction of such movement and is relatively long compared to the distance through which such movement is effected. From the above it should be apparent that displacement of the tool-carrying arms 21 responsive to steering of the machine is neither interfered with nor altered by the auxiliary tool arm positioning means comprising the bell-crank 25, the link 26 and the control lever 27 regardless of the adjusted position wherein said auxiliary positioning means may happen to be set.

When no steering operation is in progress, the arm 24 and the link 26 are stationary and the end of the link 26 connected to the bell-crank arm 25b will function as a fulcrum, should the control lever 27 be shifted to a new position, whereby rotation of the bell-crank 25 responsive to such shifting will force the member 22 toward one side of the machine to displace the tool-carrying arms 21 toward that side of the machine. This tool-arm shifting operation is obviously independent of the steering means and the position in which the steering means may happen to be.

From the above it should be seen that the positions of the tool-carrying arms 21 at any time is determined jointly by the respective positions of the steering means and the control lever 27 and that shifting movement of the tool-carrying arms 21 is the resultant of components of movement imparted thereto respectively by the steering means and the control lever 27.

In operating along the side of a hill, the rear portion of the machine will tend to slide downhill, thus placing the longitudinal axis of the machine at an angle to the actual direction of travel and necessitating the holding of the steering wheel in a position corresponding to steering of the machine toward the base of the hill. Under such conditions, tools carried by the rear portion of the implement would be displaced to a position thereof toward the base of the hill from the desired position. With my auxiliary tool positioning means such undesired displacement is compensated by properly positioning the control lever 27 to shift the tools carried by the forward portion of the implement in a down-hill direction.

It is apparent that I have invented a novel, compact, simple, effective, inexpensive and valuable improvement in cultivator shovel positioning mechanism.

While an embodiment of my invention has been illustrated and described as applied to a particular form of agricultural machine, it should be apparent that my device is readily adapted for application to many other forms of agricultural machinery and to various other machines, as for example, road working machinery and the like.

It will, of course, be understood that various changes may be made in the form, details, proportions and arrangements of the parts, without departing from the scope of my invention, which, generally stated, consists in a device capable of carrying out the objects above set forth and in the novel parts and combination of parts disclosed and defined in the appended claims.

What is claimed is:

1. In an agricultural implement having a frame, ground engaging wheels, at least one of which is steerable and means for steering said steerable wheel, the combination of a pair of arms connected at their forward ends to said implement for swinging of their rear portions laterally of said implement and adapted at their rear portions for mounting of soil-working tools thereon with means for positioning said arms relative to said implement comprising, an element connected to said respective arms and adapted for movement to swing said arms in unison, a member connected to said steering means and movable, in response to movement thereof, in a direction generally parallel to the direction of movement of said element, and means connecting said member to said element whereby said arms will be swung to various positions responsive to movement of said steering means, said connecting means being adjustively movable lengthwise of said element whereby the positions of said arms relative to the position of said steering means may be adjustively varied.

2. In an agricultural implement having a frame, a generally vertical member pivotally connected to said frame, a ground engaging wheel rotatably connected to said vertical member, means for turning said member to steer said wheel, and laterally spaced arms swingably connected to said frame at their forward ends and adapted at their rear ends for mounting of soil working tools thereon, means for positioning said arms comprising, levers connected to the respective ones of said arms for swinging the same, a bar disposed transversely of said frame and connected between said levers whereby the same will swing in unison, a lever mounted on said vertical member, an element adjustively movable lengthwise of said bar, and a link connecting said element to said last mentioned lever.

3. The structure defined in claim 2 and an operating element accessible to an operator of said implement and connected to said movable element for adjusting the position thereof on said bar.

4. In an agricultural implement having a frame, ground engaging wheels, at least one of which is steerable, means for steering said steerable wheel, and a member adapted for carrying thereon a soil-working tool and mounted on said frame with freedom for shifting movement transversely thereof, means for shifting said member comprising an element connected thereto and movable in a direction generally transverse of said frame to shift said member, a bell-crank mounted on said element with its axis of rotation substantially vertically disposed and its arms extending generally longitudinally and generally transversely of said frame respectively, a link connected between said longitudinally projecting arm and such a portion of said steering means that steering movement of said link, a shiftable control element disposed substantially longitudinally of said frame from said bell-crank, and a link connecting said control element to the transversely projecting arm of said bell-crank.

5. In an agricultural implement having a frame, a generally vertical member pivotally connected to said frame, a ground engaging wheel rotatably connected to said vertical member, means for turning said member to steer said wheel, an element connected to said frame for rotation about a generally vertical axis, and an arm connected at its forward end to said element and adapted for carrying a soil working tool on its rear portion, means for swinging said arm transversely of said frame comprising, a forwardly projecting arm on said member, a rearwardly projecting arm on said element, a bar extending and movable transversely of said frame and connected in one portion to the arm of said element, a bell-crank pivotally mounted at its hub on said bar and having one arm thereof projecting generally forwardly, a link connecting the arm of said member to the forwardly projecting arm of said bell-crank, a lever mounted rearwardly of said bell-crank, and a link connecting said lever to the remaining arm of said bell-crank.

ALTON SPANDE.